Patented Sept. 28, 1943

2,330,337

UNITED STATES PATENT OFFICE 2,330,337

ALPHA, BETA-UNSATURATED KETONES AS DRYING ACCELERATORS FOR OIL MODIFIED COATINGS

Martin E. Cupery, Wilmington, Del., assignor to E. I. du Pont de Nemours & Company, Wilmington, Del., a corporation of Delaware No Drawing. Application October 18, 1940, Serial No. 361,725

10 Claims. (Cl. 260—22)

This invention relates to drying accelerators for oleoresinous compositions and more particularly to drying accelerators for varnishes, paints, lacquers, and enamels of the type which harden by taking up oxygen from the air.

Many substances are known which when added to drying oils or products containing drying oils, increase the rate at which these materials set up to a tack-free state. Among the most effective of such substances are the lead, cobalt, and manganese salts of various organic acids. Other materials known to be effective (particularly when used in combination with the above type of metallic driers) include benzoyl peroxide and air-blown or peroxide-treated solvents such as turpentine or petroleum hydrocarbon fractions such as the copending application of Albrecht, U. S. Serial Number 290,487, August 16, 1939. The majority of this latter class of drying accelerators for drying oil compositions are, however, far from entirely satisfactory, since they possess disadvantages such as the production of an increase in viscosity or gelation of the oils on storage and a darkening of the resin film. Moreover, a faster rate of drying would be desirable, particularly at lower temperatures.

There are instances where oleoresinous compositions do not dry satisfactorily even in the presence of metallic driers. This is sometimes the case in drying oil products which are prepared under a blanket of an inert gas or in solution and essentially in the absence of oxygen. Certain drying oil modified glyceryl phthalate resins, for example, which are prepared under such conditions sometimes have very inferior drying characteristics.

To overcome the slow and nonuniform drying qualities of oleoresinous compositions, particularly those deficient in drying due to some cause such as preparation in the partial or complete absence of oxygen, it has been found helpful to add agents known as drying accelerators. Benzoyl peroxide is known to be somewhat effective (U. S. Patent No. 2,167,206) but use of this reagent is hazardous and costly. A more suitable method consists in treating special solvents for the alkyd resins with peroxides or air as disclosed in U. S. Serial Number 290,487. For example, tetralin, pinene or turpentine treated with hydrogen peroxide or blown with air improve the drying rate of alkyd resins.

It is therefore an object of this invention to provide a method for increasing the drying of varnishes, paints, lacquers, and enamels without any deleterious effect. Another object is the provision of a method for increasing the drying rate of coating compositions without increasing the viscosity or causing the gelation of oils and without darkening the dried film. Other objects will appear as the description of the invention proceeds.

These and related objects are accomplished by incorporating in an oleoresinous coating composition which dries by oxidation, an alpha, beta-unsaturated ketone in which the unsaturation is present in an aliphatic chain or a cycloaliphatic ring. According to the present invention these ketones are simply incorporated in the coating composition as illustrated by alkyd resin solutions and when the coating composition is applied to a surface in a thin film, the time for drying is reduced materially. When the drying operation is carried out at elevated temperatures (baking at 100° C.) the drying time of the treated product is roughly half that required for the untreated product. If the drying operation is carried out at room temperature the conjugated unsaturated ketone alone is not sufficient, it is necessary also to add small amounts of typical metallic driers to get optimum drying. Since, for the most part, the ketones volatilize from the applied films they should probably be considered a part of the solvent rather than a part of the final resinous film.

This invention is described more specifically in the following examples.

Example I

This example describes the use of phorone, $(CH_3)_2C=CHCOCH=C-(CH_3)_2$, in accelerating the drying rate of an oil-modified alkyd resin. One gram of phorone was added to 17 grams of a 35% solution in hydrocarbon solvents of a glyceryl phthalate resin modified with approximately 35% of linseed oil and approximately 15% of China-wood oil and having an acid number of 36. To the resulting solution 0.03% of cobalt (as cobalt naphthenate) based on nonvolatile solids was added. Flowed on glass this coating composition dried to a tack-free stage at room temperature in 90 minutes while a similar composition in which the phorone was omitted required 330 minutes. The solution showed no appreciable formation of "skin" on storage being greatly superior to a composition containing air-blown tetralin in in this respect. Moreover, the composition showed no tendency toward gelation and only a slightly increased viscosity on storage at ordinary temperatures.

Example II

This example illustrates the effect of mesityl oxide in increasing the drying rate of an oleoresinous composition. One and one-half grams of mesityl oxide were added to 25.5 grams of a 33.3% solids solution in hydrocarbon solvents of a 35-15% China-wood-linseed oil modified glyceryl phthalate resin. This composition was found to dry tack-free at 100° C. in 25 minutes whereas a similar composition without the accelerator required 40 minutes. Diacetone alcohol used in place of the mesityl oxide was found to be equally effective in accelerating the drying rate but this is probably due to dehydration of the diacetone alcohol to mesityl oxide at the high baking temperature rather than to a catalytic effect of diacetone alcohol per se. This point is brought out in air drying experiments in which the temperature is not sufficiently high to dehydrate the diacetone alcohol. In this case mesityl oxide was much more effective than the diacetone alcohol. Used in the proportions and with the resin solution described in Example I, tack-free drying times obtained were 150 minutes for mesityl oxide and 330 minutes for diacetone alcohol compared with 330 minutes for a control. The addition of the mesityl oxide accelerator did not cause a darkening of the film as is the case when metallic soap driers are used in baking finishes. There also was no tendency toward wrinkling in the baked film.

Example III

Another aliphatic alpha, beta-unsaturated ketone which decreases the drying time of oleoresinous materials is butylidene acetone, $$CH_3CH_2CH_2CH=CH-COCH_3$$

One gram of this material incorporated in 17 grams of the resin solution described in Example I, along with 0.03% cobalt drier based on nonvolatile solids, air dried to a tack-free state in 90 minutes compared with a value of 330 minutes for the control. The necessity for alpha, beta-unsaturation in the ketone is indicated by the fact that methyl ethyl ketone did not affect the drying rate while cyclohexanone even increased the length of time required to reach the tack-free state.

Other detailed examples could be given but it is thought that a tabular presentation of results will be more useful. Accordingly, the results obtained with various materials as accelerators for the drying of the oil-modified glyceryl phthalate resin described in Example I are summarized in the following table:

| | Accelerator added | Tack-free in minutes at room temperature [1] | Tack-free in minutes at 100° C.[2] |
|---|---|---|---|
| 1 | Butylidene acetone | 90 | 15 |
| 2 | Phorone | 90 | 15 |
| 3 | Mesityl oxide | 150 | 25 |
| 4 | Benzal acetone | 240 | 25 |
| 5 | Tetralin | 165 | 40 |
| 6 | Methyl ethyl ketone | 330 | 20 |
| 7 | Diacetone alcohol | 330 | 25 |
| 8 | Cyclohexanone | 450 | 60 |
| 9 | None (control) | 330 | 40 |

[1] These drying times are for 25% solid solutions to which 5.5% of accelerator and 0.02% cobalt on the basis of solids were added.
[2] These drying times are for 33.3% solid solutions to which 6% of accelerator and no drier were added.

The present invention is limited to aliphatic and cycloaliphatic alpha, beta-unsaturated ketones. The only requirement is that at least one double bond located in an aliphatic chain or a cycloaliphatic ring be conjugated with the carbonyl group. Operable unsaturated ketones include those having one double bond conjugated with the carbonyl group such as Benzal acetone $$C_6H_5CH=CHCOCH_3$$

Butylidene acetone $$CH_3CH_2CH_2CH=CHCOCH_3$$

Mesityl oxide $$CH_3COCH=C(CH_3)_2$$

Furfural acetone $$C_4H_3OCH=CHCOCH_3$$

Benzal methyl ethyl ketone $$C_6H_5CH=C(CH_3)COCH_3$$

Methyl vinyl ketone $$CH_2=CH-COCH_3$$

Ethylidene acetoacetic ester $$CH_3COC(COOCH_3)=CHCH_3$$

Beta-acetoacrylic acid or esters $$CH_3COCH=CHCOOR$$

(R is H, alkyl or cycloalkyl group)

and those containing two aliphatic double bonds conjugated with the carbonyl group such as Phorone, $$CH_3CH=CHCOCH=CHCH_3$$

Dibenzalacetone, $$C_6H_5CH=CHCOCH=CHC_6H_5$$

Difurfuralacetone, $$C_4H_3OCH=CHCOCH=CHC_4H_3O$$

The keto group and/or the double bond may also be present in a cycloaliphatic ring. Examples of compounds of this type including one of the many such naturally occurring terpene compounds are:

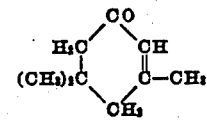

Isophorone

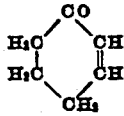

Cyclohexenone

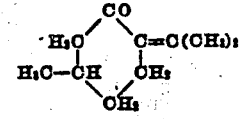

Pulegone

Materials which generate alpha,beta-unsaturated ketones on heating or under the conditions of use are also included in the scope of this invention particularly for baking finishes. An example of such a material is diacetone alcohol.

The quantity of alpha, beta-unsaturated ketone used to accelerate the drying of an oleoresinous composition depends on a number of considerations. Quantities of accelerator in amounts ranging from 0.5% to 20% based on resin solids are the preferred amounts. The limits of the preferred range are set by economic considerations for the upper limit and by the effective minimum quantity for the lower limit. The amount used will vary appreciably with the nature of the accelerating ketone and with the nature of the oleoresinous material in which it is incorporated. It is understood that amounts above and below the range given are within the scope of the present invention.

Although the preferred embodiment of this invention relates to improved drying rates for oil-modified glyceryl phthalate resin the alpha, beta-unsaturated ketones will effectively decrease the drying time of other oleoresinous materials which harden to final form by the absorption of oxygen from the air. The drying rate of varnishes, enamels and paints made with unsaturated oils such as China-wood oil, linseed oil, oiticica oil, dehydrated castor oil, perilla oil, soya bean oil, or cottonseed oil would be increased by adding alpha beta-unsaturated ketone, particularly in cases where drying is deficient for the particular product.

It will be noted from the examples that the addition of a metallic drier is desired particularly in air-drying compositions. In place of the cobalt naphthenate drier disclosed in the examples, other driers such as manganese naphthenate, the cobalt or manganese salts of coconut oil acids and similar long-chain aliphatic monocarboxylic acids may be used. The choice of drier will be governed by various conditions such as cost, suitability and availability and will be readily apparent to those skilled in the art of using driers. Cobalt and manganese driers are used in concentrations ranging from 0.01% to 0.5% (as metal), the amount used depending on the rate of drying desired, the baking temperature, and the particular oleoresinous material being dried. The use of a lead drier would necessitate higher concentrations, but the invention is not limited to specific amounts of drier. In general a drier is used for air-drying compositions but is omitted from baking compositions. This does not mean that driers cannot be omitted in air-drying compositions or included in baked ones, since for extremely fast-drying baking compositions both drier and accelerator would be used.

The products of this invention are useful as vehicles for improved, rapid setting, air drying and baking coating compositions. In their formulation any of the methods known in the art may be followed which uses thinners, pigments, metallic driers, dyes, fillers, waxes, inhibitors, plasticizers or other film-forming materials, for example, cellulose derivatives, such as cellulose esters, ethers and ether esters, urea-formaldehyde resins and chlorinated rubber. The products of the invention are useful in protecting surfaces against marring, atmospheric corrosion, decay and for ornamenting and beautifying surfaces. They may be applied directly or over a suitable base coat to metal, wood, glass, leather, stone, cloth, paper, rubber, or cellulose by brushing, spraying, dipping or any of the known methods of application.

One of the preferred embodiments of the invention involves coating compositions in which substantial amounts of mesityl oxide or preferably butylidene acetone are incorporated in a solution of a drying oil modified glyceryl phthalate resin. Satisfactory results are obtained in baked finishes without the addition of drier but for air-drying finishes 0.03% cobalt naphthenate (as metallic cobalt based on resin solids) should be added.

It is apparent that many widely different embodiments of this invention may be made without departing from the spirit and scope thereof, and therefore, it is not intended to be limited except as indicated in the appended claims.

I claim:

1. A coating composition comprising a film-forming ingredient, a drier, and from 0.5 to 20 per cent of an alpha-beta-ethylenically unsaturated ketone based on the weight of the film-forming ingredient, said film-forming ingredient consisting essentially of those which harden by taking up oxygen from the air.

2. A coating composition comprising as substantially the sole film-forming ingredient one which hardens by taking up oxygen from the air, a drier, and as an accelerator from 0.5 to 20 per cent of an aliphatic unsaturated ketone having a carbonyl group conjugated with an ethylenic double bond.

3. The product of claim 1 in which the film-forming ingredient is an oil modified alkyd resin.

4. The product of claim 2 in which there is at least one double bond in an aliphatic chain conjugated with a carbonyl group.

5. The product of claim 2 in which there is at least one double bond in a cycloaliphatic ring conjugated with a carbonyl group.

6. The composition of claim 2 in which the ketone is mesityl oxide.

7. The composition of claim 2 in which the ketone is butylidene acetone.

8. An air drying coating composition which dries at room temperature comprising as the sole film-forming ingredient one which hardens by taking up oxygen from the air, and from 0.5% to 20% thereof, of an alpha, beta-ethylenically unsaturated ketone, and a small amount of a metallic drier.

9. The composition of claim 8 in which the drier is cobalt naphthenate.

10. An air-drying coating composition comprising an oil modified alkyd resin as the sole film-forming ingredient and from 0.5 to 20 per cent of an aliphatic unsaturated ketone having a carbonyl group conjugated with an ethylenic double bond.

MARTIN E. CUPERY.